Dec. 17, 1929.  B. GRANVILLE  1,739,756
FLEXIBLE SHAFT
Original Filed July 28, 1922   2 Sheets-Sheet 1
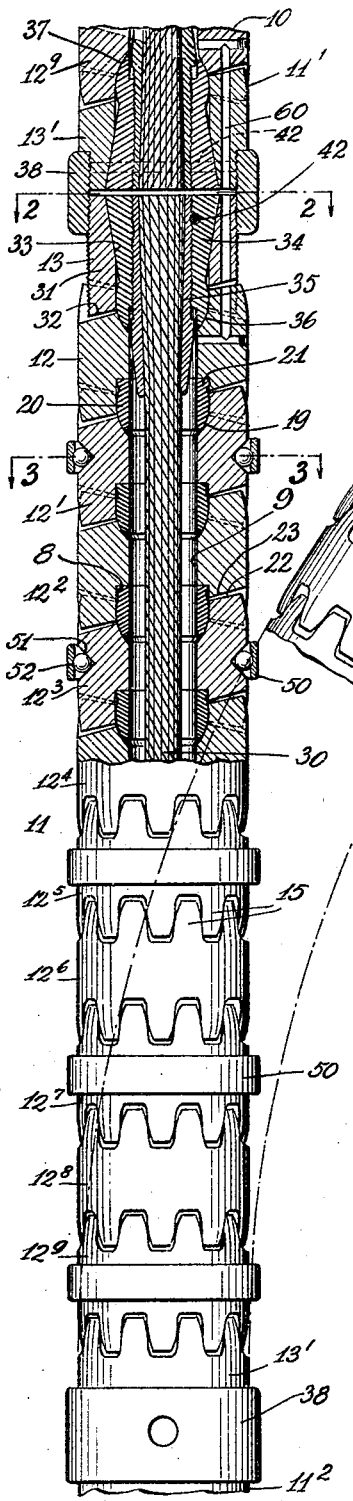
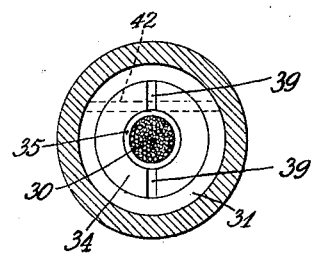
Fig. 1.
Fig. 2.
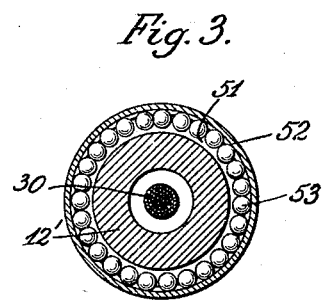
Fig. 3.
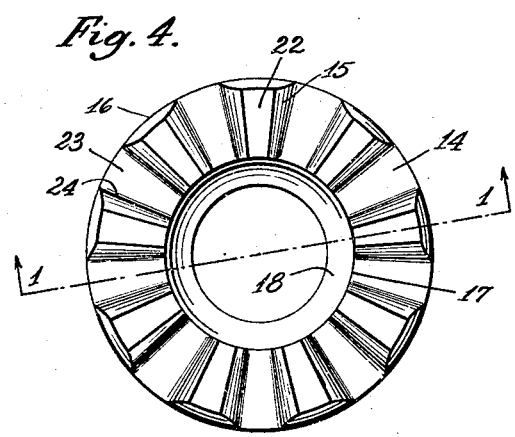
Fig. 4.
INVENTOR.
Bernard Granville
BY Arthur L. Kent
his ATTORNEY.

Dec. 17, 1929.  B. GRANVILLE  1,739,756
FLEXIBLE SHAFT
Original Filed July 28. 1922  2 Sheets-Sheet 2
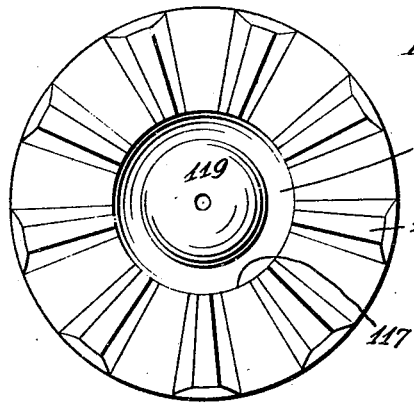
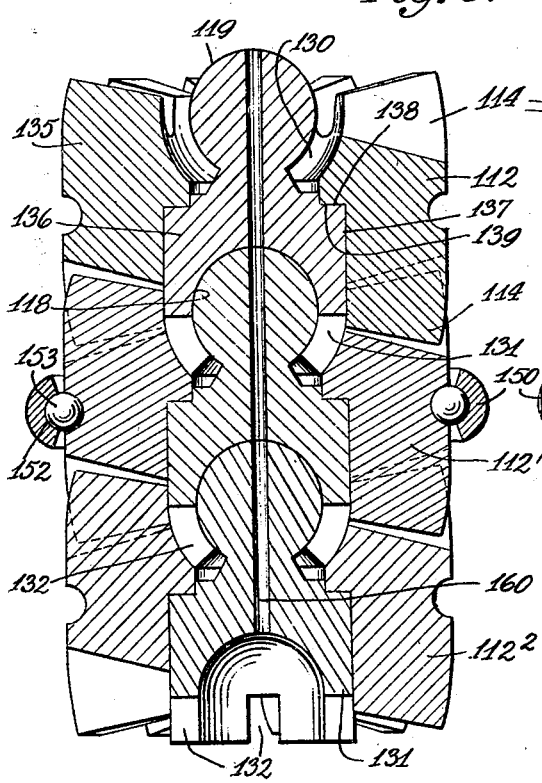
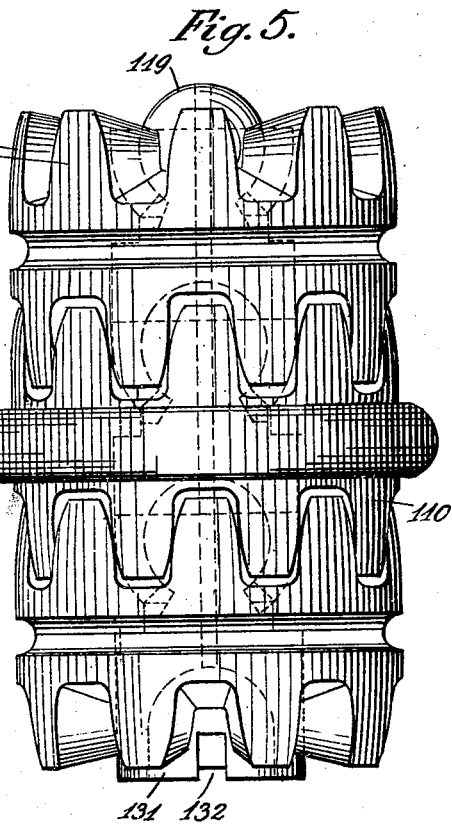
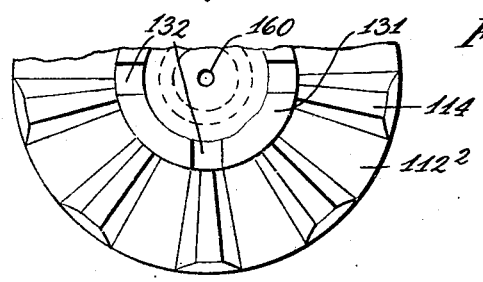

Patented Dec. 17, 1929

1,739,756

UNITED STATES PATENT OFFICE

BERNARD GRANVILLE, OF NEW YORK, N. Y., ASSIGNOR TO GRANVILLE HOLDING CORPORATION, A CORPORATION OF NEW YORK

FLEXIBLE SHAFT

Application filed July 28, 1922, Serial No. 578,107. Renewed February 14, 1929.

This invention relates to flexible shafts, and aims to provide a flexible shaft of simple construction and great strength.

An object of the invention is to provide a flexible shaft adapted to carry a heavy load without material loss in friction between parts of the shaft when the shaft is flexed.

A further object of the invention is to provide a flexible shaft which may be enclosed in a flexible pipe and the two together drawn through an elbow in a rigid pipe, while the shaft is rotating, without injury to the flexible pipe or shaft, and with minimum friction between the shaft and the flexible pipe. The new flexible shaft is thus adapted for use in connection with lateral drilling apparatus such as that shown in my U. S. Patent No. 1,367,042, as well as for use for many other purposes.

A flexible shaft of approved construction embodying the invention consists of a series of short shaft sections or units having a general cylindrical shape. A pivotal connection between the units is provided by corresponding convex and concave spherically curved surfaces formed on the ends of the units and means for retaining these spherically curved surfaces of adjacent units in contact with each other. In order to transfer the torque applied to one end of the shaft from each unit to the adjacent unit, the units have, at their ends, intermeshing gears. In order to transfer the greatest possible amount of torque, the gears are formed on the outer portions on the ends of the units. They are provided with radial teeth which extend between two concentric circles, and may conveniently be termed "ring gears." The spherically curved surfaces of the units and the means for holding these surfaces in contact with each other are located within the inner circles of the ring gears. A continuous channel extending through the units for supplying lubricant to the ring gears is also located within the inner circles of the gears. The gears are formed so that the outer ends of the teeth of one gear are spaced from the inner ends of the recesses between the teeth of the cooperating gear of the adjacent unit when the axes of the units are aligned. The clearance thus provided permits the axis of each unit to be turned at an angle to the axis of the adjacent unit about the center of the spherically curved surfaces of the units.

In order to avoid friction between the gears of adjacent units when the shaft is flexed the sides of the teeth of each gear are given an involute form, so that the teeth may conveniently be referred to as radial involute teeth.

In order to prevent the ends of the units from projecting outwardly when the shaft is flexed and thus injuring a pipe in which the shaft may be placed, the end portions of the outer periphery of each unit, which form the outer sides of the teeth of the gears, are tapered inwardly. The taper is most desirably along an arc concentric with the spherical surfaces of the unit.

In order to eliminate friction between the shaft and a pipe in which it may be placed, all, or certain, of the units are provided with bearing rings adapted to bear against the inside of a pipe and mounted upon the shaft by means of ball bearings so that the shaft may rotate freely within the bearing rings.

In order that the invention may clearly be understood, I will describe in detail the specific embodiments of it which are illustrated in the accompanying drawings, in which:—

Fig. 1 is a side view partly sectioned on the line 1—1 of Fig. 4 and showing a form of flexible shaft in which a plurality of units are held together by a flexible cable;

Fig. 2 is a transverse section on the line 2—2 of Fig. 1;

Fig. 3 is a transverse section on the line 3—3 of Fig. 1;

Fig. 4 is an enlarged end view of one unit of the type shown in Fig. 1;

Fig. 5 is a side view of a form of shaft in which the adjacent units are interlocked;

Fig. 6 is an axial section of the shaft shown in Fig. 5;

Fig. 7 is a top end view, and Fig. 8 a bottom end view, of one of the units shown in Figs. 5 and 6; and Fig. 9 is an axial section of the bearing ring shown in Figs. 5 and 6 showing the condition of the ring before it is applied to the shaft.

I will first describe the type of flexible shaft illustrated in Figs. 1 to 4, as this is the type which I now consider best. The shaft 10 shown in Fig. 1 is made up of a plurality of sections of which one, 11, is shown in Fig. 1, while parts of two others, 11', 11², are also shown in this figure. Each section consists of a series of units 12, 12', 12², etc. and two end members 13, 13'.

As the units 12, 12', 12², etc. are all substantially identical, a description of one of them will suffice.

The unit 12 is in general of cylindrical form. An axial hole 9 extends through the unit. Upon the outer portions of each end of the unit is formed a gear 14 having radial teeth 15 which extend from the circle 16, which is the outer periphery of the unit, to an inner concentric circle 17 spaced outwardly from the periphery of the hole 9. At one end of the unit 12, which for convenience will be termed the upper end, is formed a concave spherically curved surface 18 within the circle 17. At the other or lower end of the unit 12 is formed a convex spherically curved surface 19. For convenience in construction, the spherically curved surface 19 is not formed upon the same piece of material as that from which the rest of the unit 12 is constructed but upon a separate collar 20 which has an outer cylindrical surface 21 seated in a cylindrical recess 8 formed about the lower portion of the hole 9.

The outer ends 22 of the teeth 15 at the upper end of the unit 12 lie on a conical surface having its apex at the center of the spherically curved surface 18. The inner ends 23 of the recesses between the teeth 15 lie on a conical surface also having its apex at the center of the spherically curved surface 18. The teeth 22 at the lower end of the unit 12 are similar in form to those at the upper end, and the conical surfaces upon which the outer ends of the teeth and the inner ends of the recesses lie have their apices at the center of the spherically curved surface 19.

The sides 24 of the teeth 15 extend radially toward the axis of the unit and are so formed that sections of the sides on cylindrical surfaces coaxial with the unit all have the form of involutes. The teeth 15 may, therefore, conveniently be referred to as "radial involute teeth."

The gears 14 are so formed that when the spherically curved surfaces of adjacent units are in contact with each other and the axes of the units are coincident, a clearance space 25 is provided between the upper ends 22 of the teeth 15 of one unit and the inner ends 23 of the recesses between the teeth of the cooperating gear of the adjacent unit.

The units 12, 12', 12², etc. of each section of the shaft 10 are held together with their corresponding spherically curved surfaces 18, 19 in contact by means of a tension member 30 whose ends are retained in the end members 13, 13' of the section. The end member 13 has an outer cylindrical portion 31 at the lower end of which is formed a ring gear 32 similar to the ring gears 14 of the units. Through the cylindrical member 31 extends an axial hole 33 the upper portion of which tapers outward. In the hole 33 is a wedge nut 34 which is screwed upon a threaded cone or thimble 35 in which the end of the tension member 30, which in the form shown consists of a wire cable, is secured. On the lower end of the nut 34 is formed a convex spherically curved surface 36 similar to the surfaces 19 of the units and adapted to fit into the concave surface 18 of the unit 12.

The end member 13' of each section is similar to the end member 13. It should be noted that the lowermost unit 12⁹ of each section does not contain a sleeve 20 but instead has a concave surface 37, similar to its concave surface 18, formed on its lower end.

The end member 13 of the section 11 is secured to the end member 13' of the section 11' by means of a coupling ring 38 which is screwed upon both end members.

An oil hole 60 is formed in the end members 13, 13' and in the units 12, 12⁹ adjacent to the end members.

Each section of the flexible shaft 10 which has been described is assembled in the following manner:

The ends of the cable 30 are spread out and filled in with melted zinc, and are thus secured in the threaded cones or thimbles 35 whose tapered holes grip the enlarged tapered ends of the cable so that it cannot be pulled from them. The units 12, 12', 12², etc. with their sleeves 20 are then placed around the cable 30. It may be noted that the outside diameter of the threaded cones 35 is less than the diameter of the hole 9 in the units 12, 12', etc., so that the threaded cones 35 do not interfere with placing the units upon the cable. When all the units are in position on the cable the outer cylinders 31 of the end members 13, 13' are placed about the ends of the cable. The nuts 34 are then screwed upon the threaded cones 35 by means of tool engaging slots 39 in their outer ends. As the nuts are screwed inward, their conical surfaces engage the conical surfaces of the holes 33 in the cylindrical members 31, drawing the cable 30 tight and bringing the cooperating spherical surfaces of the units into contact with each other. Pins 42 are then passed through holes which extend through the cylindrical members 31, the nuts 34, and the threaded cones or thimbles 35, so that the pins serve to retain these members against relative rotation. Each end of the cable 30 is thus held against rotation with respect to the end member 13 or 13' in which it is secured.

After each section of the shaft has been assembled any desired number of sections are then secured together by coupling rings 38. It may be noted that after the coupling rings have been screwed upon the end members of each section they serve to prevent the pins 42 from coming out.

The cooperating spherical surfaces 18, 19 of the units and the cooperating ring gears 14 are supplied with lubricant from the channels formed by the axial holes 9 in the units. The portion of this channel outside the cable 30 may be filled with grease when the shaft is assembled, or alternatively oil may be admitted to this channel at the upper end of the shaft, in which case, it passes through the oil hole 60 from the channel formed by the axial holes 9 of the units of one section to the channel formed by the axial holes 9 of the next section.

If the shaft is to be used within a pipe, it is provided with bearing rings 50. For this purpose some or all of the units have circumferential ball races 51 formed in their cylindrical surfaces. The bearing rings 50 each contain a ball race 52 in their inner surfaces. The bearing rings are placed about the units and after anti-friction balls 53 have been placed between the races 51 and 52 the rings 50 are compressed or shrunk inwardly so as to hold the balls in position between the races. It is desirable to provide a bearing ring 50 on every alternate unit, as shown.

In the use of the flexible shaft which has been described, the turning force applied at one end of the shaft is transferred through the ring gears from one unit to the next and through the coupling rings 38 from one section to the next. The cooperating spherically curved surfaces of the units and the clearance allowed between the cooperating gears permit the axis of each unit to be tipped in any direction with respect to the axis of the adjacent unit. When this is done the involute sides of the teeth of the ring gears of the adjacent units engage smoothly and transfer the torque of one unit to the next without material frictional loss.

It should be noted that as each end of the cable 30 of each section is held against rotation in the end member in which it is secured, and as the rotation of the end member 13 is transferred to the end member 13' of the same section through the ring gears, there is no relative rotation of the ends of the cable during the rotation of the shaft. This is important since it prevents any twisting of the cable which would result in shortening or lengthening it.

When the flexible shaft is used in a pipe, the bearing rings 50 bear against the inside of the pipe with no or only slight rotation, while the shaft rotates on the anti-friction balls 53.

The form of flexible shaft illustrated in Figs. 5 to 9 is in general similar to the form already described except that different means are provided for securing the units together. The shaft 110 consists of a series of units 112, 112', 112², etc., each of which is provided on the outer portions of its ends with a ring gear 114 similar to the ring gear 14 of the units 12, 12', etc. At the one end, which may conveniently be termed the upper end, of each unit is a convex hemi-spherical surface 119 which lies within the inner circle 117 of the gear rings 114. At the other or lower end of each unit is formed a concave hemi-spherical surface 118 which fits upon the convex surface 119 of the adjacent unit.

In this form of flexible shaft the means for holding the corresponding concave and convex spherically curved surfaces 118 and 119 of the units in contact with each other are formed as a part of the units. In the upper end of each unit between the convex surface 119 and the gear ring 114 is formed an inwardly tapering spherically curved recess 130. At the lower end of each unit is a flange 131 extending from between the concave surface 118 and the gear ring 114. After the units are assembled this flange is spherically curved and extends into the recess 130 of the adjacent unit so as to lock the units together.

Before the units are secured together the flange 131 of each unit is cylindrical in form, as illustrated in connection with the unit 112², Figs. 5 and 6. The flange 131 contains a plurality of radial slots 132.

In assembling the flexible shaft the units are forced together. The flange 131 of each unit is forced into the spherical recess 130 of the adjacent unit, sufficient pressure being applied to bend the flange inwardly so that it becomes spherical, fits in the recess, and locks the units together.

In this type of flexible shaft each unit 112, 112', etc. may be formed of a single piece of metal. For convenience in manufacture, however, I find it desirable to make each unit of an outer piece 135 and an inner piece 136 as illustrated. The inner piece 136 fits in an axial bore 137 formed in the outer piece 135 and has a shoulder 138 which abuts against a shoulder 139 in the bore 137 when the units are forced together.

A small bore 160 in the inner piece 136 of each unit provides a continuous passage for the supply of oil to the spherical surfaces and ring gears.

When this type of shaft is to be used in a pipe it may be provided with bearing rings similar to the bearing rings 50 shown in Fig. 1. The bearing ring 150, shown in Figs. 5 and 6, differs from the bearing rings 50, however, in that in its original form it is provided with a cylindrical flange 154 which is bent inwardly, after the anti-friction balls 153 have been placed in the position, to form the ball race 152.

The operation of the second type of flexible shaft is similar to the first type.

It should be clearly understood that the invention is by no means limited to the two illustrative embodiments of it which have been described. Thus, it is apparent that the cooperating spherical surfaces of the units need not be arranged in such a way that each unit is provided with one convex surface and one concave surface.

It should be understood also that the invention is not limited to any particular use of the flexible shaft which has been described. The flexible shaft may, for example, be made shorter than as illustrated in the drawings and may be used as a flexible coupling to connect the ends of two rigid shafts, or it may be used to replace a universal joint. When used for these purposes the shaft, if of the form shown in Figs. 1 to 4, will usually consist of a single section, and this section may in some instances consist merely of two end members with a single unit between them.

What is claimed is:

1. A flexible shaft, comprising a series of units, each having at one of its ends a concave spherically curved surface and at its other end a convex spherically curved surface restrained against turning across the axis of the unit, cooperating ring gears formed on the ends of the units and lying without their spherically curved surfaces, and means located within the inner circles of the ring gears for retaining the spherically curved surfaces of adjacent units in contact with each other, the gears being formed to provide a clearance permitting the axis of each unit to extend at an angle to the axis of the next unit.

2. A flexible shaft, comprising a series of units having at their ends cooperating spherically curved surfaces and cooperating ring gears, and means for retaining the spherically curved surfaces of adjacent units in contact with each other, the units having longitudinal holes therethrough within their ring gears forming a continuous channel through which lubricant may be supplied to the spherical surfaces and gears.

3. A flexible shaft section, comprising two end members, each having a tapered axial hole therethrough and each having at its inner end an annular spherically curved surface and a ring gear, means between said end members containing an axial hole and having at its ends ring gears and annular spherically curved surfaces adapted to cooperate with those of the end members, and a flexible tension member having its ends secured in the tapered holes of the end members extending through the axial hole of said means and serving to hold the corresponding spherically curved surfaces of said means and end members in contact with each other.

4. A flexible shaft section, comprising end members each consisting of an outer cylindrical member containing a tapered axial bore, a nut having an outer conical surface fitting the said bore, and a gripping sleeve within said nut and having a threaded connection therewith, means between said end members having an axial hole therethrough of a diameter greater than the outside diameter of the gripping sleeves of the end members, said end members and said means being provided with cooperating annular spherically curved surfaces and with cooperating gear teeth, and a flexible cable having its ends secured in the gripping sleeves of said end members, extending through the axial hole in said means, and serving to hold said cooperating spherical surfaces in contact with each other.

5. A flexible shaft section, comprising end members, a series of units between said end members formed to engage each other and transmit a turning movement of one end member to the other end member, each of said units containing an axial hole, and a flexible tension member extending through the axial holes of the units and having its ends secured in said end members respectively and each retained against rotation with respect to the end member in which it is secured so that no twisting of the tension member occurs in the operation of the shaft section.

6. A flexible shaft section, comprising end members, means between said end members formed to engage the end members and transmit a turning movement of one end member to the other end member, said means containing an axial hole, and a flexible tension member extending through the axial hole of said means and having its ends secured in said end members respectively and each retained against rotation with respect to the end member in which it is secured so that no twisting of the tension member occurs in the operation of the shaft section.

7. A flexible shaft unit, comprising an outer cylindrical member having an axial hole therethrough and an annular concave spherically curved recess about said hole on one end of the unit and an annular cylindrical recess about said hole on the other end of the unit, an inner collar seated in said cylindrical recess and having an axial hole therethrough of the same diameter as the hole in the outer member and having on its outer end an annular convex spherically curved surface, and ring gears formed upon the portions of the ends of the cylindrical member outside said annular recesses.

8. A flexible shaft section, comprising end members, a series of units between said end members formed to engage each other and transmit a turning movement of one end member to the other end member, each of said units containing an axial hole, a flexible tension member extending through the axial holes of the units and having one of its ends secured in one of the end members, and means on the other end member for drawing said cable tight so as to force the units into engagement with each other.

9. A flexible shaft section, comprising end members, a series of units between said end members containing axial holes and having at their ends cooperating ring gears and cooperating spherically curved surfaces, a flexible tension member extending through the axial holes of the units and having one of its ends secured to one of said end members, and means on the other end member for drawing said tension member tight so as to force the spherically curved surfaces of adjacent units into contact with each other.

10. A flexible shaft section, comprising a series of substantially cylindrical units each having formed on each of its ends a ring gear with radial teeth and each having on one of its ends a spherically curved surface lying within the inner circle of the ring gear, and at its other end a cylindrical recess, a collar mounted in the cylindrical recess of each unit and having a spherically curved surface engaging the spherically curved surface of the next unit, and a tension member extending through the units and through the collars and serving to hold the spherically curved surfaces of the units and collars in engagement with each other.

In testimony whereof I have hereunto set my hand.

BERNARD GRANVILLE.